April 19, 1960 P. B. ONCLEY 2,933,697

ELECTRONIC MUSICAL INSTRUMENT HAVING VOLTAGE SENSITIVE FREQUENCY VARIATION MEANS

Filed May 13, 1955

INVENTOR.
PAUL B. ONCLEY
BY
Cyrus D. Samuelson
ATTORNEY

United States Patent Office 2,933,697

Patented Apr. 19, 1960

2,933,697

ELECTRONIC MUSICAL INSTRUMENT HAVING VOLTAGE SENSITIVE FREQUENCY VARIATION MEANS

Paul B. Oncley, Princeton, N.J., assignor to Gulton Industries, Inc., Metuchen, N.J., a corporation of New Jersey Application May 13, 1955, Serial No. 508,040

4 Claims. (Cl. 331—48)

My invention relates to electronic musical instruments and in particular to those electronic musical instruments in which it is necessary to tune a number of tone oscillators at the same time so as to maintain the proper tonal relationship among them.

A principal object of my invention is to provide means for adjusting the frequency of a number of separate tone oscillators simultaneously.

A further object of my invention is to provide means for adjusting the frequency of individual tone oscillators.

A still further object of my invention is to provide means for frequency modulating a group of oscillators at a low frequency rate.

Other objects and advantages of my invention will be apparent during the course of the following description.

Figure 1:
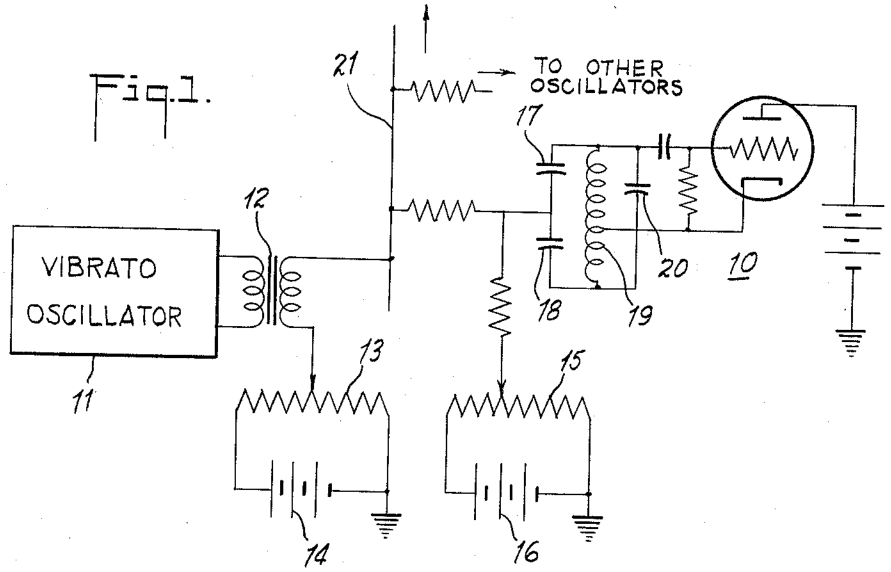
Figures 2, 3:
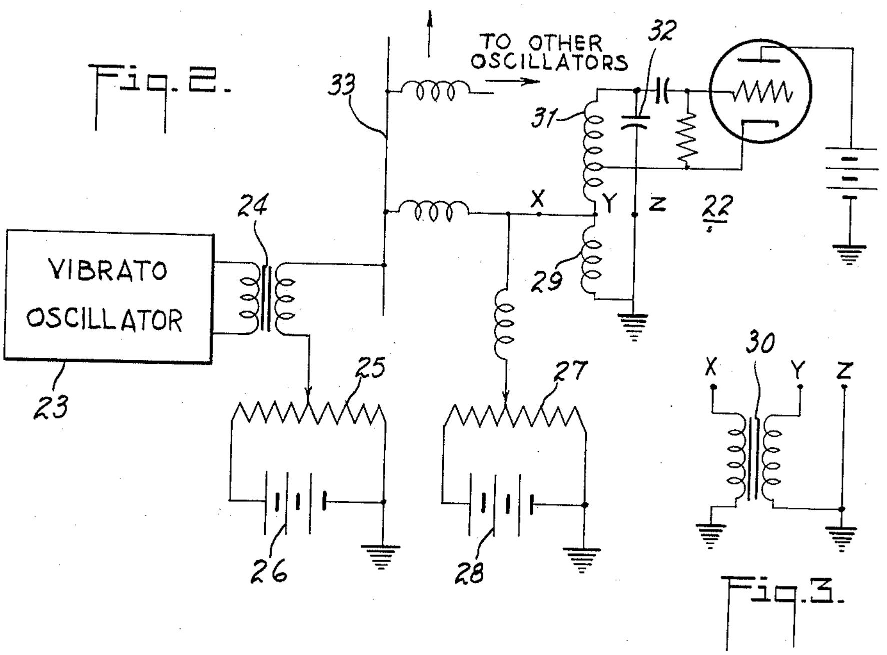

In the acccompanying drawings, forming a part of this application, and in which like numerals are employed to designate like parts throughout the same, Figure 1 is a schematic diagram of an embodiment of my invention, Figure 2 is a schematic diagram of a further embodiment of my invention, and Figure 3 is a schematic diagram of an alternative element which may be employed in the embodiment of Figure 2.

In the drawings, wherein for the purpose of illustration, are shown preferred embodiments of my invention, the numeral 10 designates the tone oscillator, generally, and the numeral 11 designates the vibrato oscillator, generally. Inductor 19 and capacitor 20 are the main tuning components of oscillator 10 and non-linear capacitors 17 and 18 serve to change the frequency of oscillator 10 depending upon the voltage applied to them. Potentiometer 15 serves to apply a portion of the voltage from battery 16 to non-linear capacitors 17 and 18. Potentiometer 13 serves to apply a portion of the voltage from battery 14 to bus 21 and thence to the several non-linear elements of those oscillators which are connected to bus 21. Transformer 12 is employed to couple the output of vibrato oscillator 11 to the bus 21.

The numeral 22 designates a tone oscillator, generally, and the numeral 23 designates a vibrato oscillator, generally. Inductor 31 and capacitor 32 are the main tuning components of oscillator 22 and non-linear inductor 29 serves to change the frequency of oscillator 22 depending upon the voltage applied to 29. Non-linear transformer 30 may be substituted for non-linear inductor 29. Potentiometer 27 serves to apply a portion of the voltage from battery 28 to non-linear inductor 29 or non-linear transformer 30. Potentiometer 25 serves to apply a portion of the voltage from battery 26 to bus 33 and thence to the several non-linear elements of those oscillators which are connected to bus 33. Transformer 24 serves to couple the output of vibrato oscillator 23 to bus 33.

Non-linear capacitors are electrical circuit elements whose characteristics vary in accordance with the voltage applied to them and non-linear inductors and transformers are electrical circuit elements whose characteristics vary in accordance with the current flowing in them. The ferroelectric ceramics such as barium titanate and similar materials are typical of the dielectrics which are employed in non-linear capacitors. Non-linear inductors and transformers are often produced by winding the coils on ferrite cores which are made of oxides of iron and nickel, or other ferromagnetic ceramic or similar material.

It is often necessary to vary the tuning of a group of oscillators of an electronic musical instrument simultaneously such as when it is desired to tune an electronic musical instrument to synchronism with other instruments such as a piano or a group of pipes in a combined pipe-electronic organ. This may be accomplished economically, simply and easily by the employment of non-linear tuning elements and suitable biasing arrangements. Oscillator 10 and all other oscillators similarly connected to bus 21 may be tuned and voiced at the same time by the use of circuits in accordance with my invention. The fundamental frequency of 10 is determined by the values of inductor 19 and capacitors 20, 17 and 18. Either or both of capacitors 17 and 18 may be non-linear capacitors. A portion of the voltage from battery 14 is applied to the junction of 17 and 18 through potentiometer 13. As the position of potentiometer 13 is changed, the amount of voltage applied to non-linear capacitors 17 and 18 is changed, thereby changing the capacity of 17 and 18 and consequently changing the frequency of oscillator 10 and any other oscillators with non-linear elements which are similarly affected and are connected to bus 21. Either 17 or 18 may be non-linear or both may possess non-linear characteristics, depending only on the design of the individual oscillator and the values of 19 and 20 with respect to 17 and 18.

In a similar manner, it is possible to vary a group of oscillators in which the non-linear elements are inductors or transformers such as is illustrated in Figures 2 and 3. The fundamental frequency of oscillator 22 is determined by the values of inductor 31, capacitor 32 and non-linear inductor 29. Non-linear transformer 30 may be substituted for non-linear inductor 29 by removing inductor 29 from the circuit of Figure 2 and connecting transformer 30 such that points X, Y and Z of Figures 2 and 3 coincide. A portion of the voltage from battery 26 is applied through potentiometer 25 to bus 33 and thence to non-linear inductor 29. As the position of potentiometer 25 is changed, the amount of voltage applied to non-linear inductor 29 is changed, thereby changing the frequency of oscillator 22 and any other oscillators which are connected to bus 33 and contain non-linear elements which are affected in a similar manner.

When non-linear transformer 30 is employed in place of inductor 29, the voltage applied from battery 26 serves to bias one winding of 30 and thus to impose a magnetic field in the ferromagnetic core of the transformer. Biasing of both inductor 29 and transformer 30 may also be accomplished by the use of permanent magnets in place of the biasing voltage or a combination of both methods.

By suitable selection of circuit elements and other parameters, oscillators utilizing non-linear capacitors may be connected to the same bus as those utilizing non-linear inductors or transformers without affecting the operation of my invention, adversely.

It is often desirable to vary and adjust the frequency of a single oscillator so that a similar set of biasing means such as have been described for the bus circuits of Figures 1 and 2 may be employed for the individual oscillators. In Figure 1, potentiometer 15 and battery 16 serve the same purpose for oscillator 10, only, as is served by potentiometer 13 and battery 14 for bus 21. In Figure 2, potentiometer 27 and battery 28 serve the same purpose for oscillator 22, only, as is served by potentiometer 25 and battery 26 for bus 33.

It is often musically desirable to vary the frequency of a group of tone oscillators by a small amount at a low frequency rate of the order of 6 to 9 cycles per second. This effect is known as vibrato or tremolo. This vibrato effect requires that the separate tone oscillators be frequency modulated by a small amount at the frequency of the vibrato oscillator.

Vibrato oscillator 11 is adjusted to the frequency at which it is desired to modulate the tone oscillators connected to bus 21 and the voltage across the secondary of transformer 12 serves to vary the capacity of non-linear capacitors 17 and 18. This action varies the frequency of the oscillator 10 in accordance with the frequency of vibrato oscillator 11. In a similar manner, the output of vibrato oscillator 23 is applied to bus 33 through transformer 24. The current from transformer 24 which flows through non-linear inductor 29 or non-linear transformer 30 varies the inductance of inductor 29 or transformer 30 at the rate of the oscillation of vibrato oscillator 23 and thereby varies the frequency of oscillator 22 by a small amount at the rate of the frequency of vibrato oscillator 23. The amount of frequency variation of oscillators 10 and 22 is determined by the amplitude of the signal from vibrato oscillators 11 and 23 respectively.

Any one of the features of my invention may be employed in electronic musical instruments without any of the others. For example, the method of producing vibrato may be utilized without including the frequency adjusting features in a particular instrument. Also, non-linear capacitors, inductors and transformers may be employed in a single tone oscillator or group of oscillators depending only on design of the particular instrument.

I prefer to consider non-linear capacitors, inductors and transformers as voltage-sensitive devices, being fully cognizant of the fact that the inductance of non-linear inductors and transformers varies in accordance with the current flowing through them. They are voltage-sensitive because the current flow varies in accordance with the applied voltage which is the fundamental driving potential in the production of the current flow.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. An electronic musical instrument comprising in combination a plurality of tone oscillators, each of said tone oscillators having as a part of its tuning circuit at least one voltage sensitive element comprising a material selected from the group consisting of ferroelectric and ferromagnetic materials, a source of low frequency oscillations, means for varying the value of each said voltage sensitive element separately and means for varying the value of said voltage sensitive elements simultaneously, said source of low frequency oscillations being connected to said plurality of tone oscillators such that the frequency of each of said plurality of tone oscillators is varied at the frequency of said source of low frequency oscillations.

2. An electronic musical instrument as described in claim 1 wherein said voltage sensitive element is ferroelectric.

3. An electronic musical instrument as described in claim 2 wherein said voltage sensitive element is composed largely of barium titanate.

4. An electronic musical instrument as described in claim 1 wherein said voltage sensitive element is ferromagnetic.

References Cited in the file of this patent

UNITED STATES PATENTS

| | | |
|---|---|---|
| 1,680,758 | Alexanderson | Aug. 14, 1928 |
| 2,182,377 | Guanella | Dec. 5, 1939 |
| 2,356,510 | Deserno | Aug. 22, 1944 |
| 2,407,270 | Harrison | Sept. 10, 1946 |
| 2,495,634 | Hepp | Jan. 24, 1950 |
| 2,526,207 | Donley et al. | Oct. 17, 1950 |
| 2,649,006 | Heytow et al. | Aug. 18, 1953 |
| 2,681,585 | Hanert | June 22, 1954 |
| 2,770,734 | Reek | Nov. 13, 1956 |
| 2,788,446 | Cerveny et al. | Apr. 9, 1957 |